United States Patent
Sandberg et al.

(10) Patent No.: US 9,826,543 B2
(45) Date of Patent: Nov. 21, 2017

(54) METHOD AND APPARATUS IN A WIRELESS COMMUNICATION SYSTEM

(71) Applicant: TELEFONAKTIEBOLAGET L M ERICSSON (PUBL), Stockholm (SE)

(72) Inventors: David Sandberg, Solna (SE); Alexander Langereis, Sigtuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 27 days.

(21) Appl. No.: 15/029,670

(22) PCT Filed: Oct. 16, 2013

(86) PCT No.: PCT/EP2013/071591
§ 371 (c)(1),
(2) Date: Apr. 15, 2016

(87) PCT Pub. No.: WO2015/055238
PCT Pub. Date: Apr. 23, 2015

(65) Prior Publication Data
US 2016/0278113 A1    Sep. 22, 2016

(51) Int. Cl.
*H04W 72/12* (2009.01)
*H04W 28/02* (2009.01)

(52) U.S. Cl.
CPC ... *H04W 72/1257* (2013.01); *H04W 28/0278* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2011/0292901 A1* | 12/2011 | Pettersson | H04W 72/1252 370/329 |
| 2014/0247742 A1* | 9/2014 | Lee | H04W 52/0216 370/252 |
| 2015/0049678 A1* | 2/2015 | Speight | H04W 72/042 370/329 |

FOREIGN PATENT DOCUMENTS

| | | |
|---|---|---|
| EP | 1509011 A2 | 2/2005 |
| WO | 2008156198 A2 | 12/2008 |
| WO | 2010090565 A1 | 8/2010 |
| WO | 2010090566 A1 | 8/2010 |
| WO | 2012175113 A1 | 12/2012 |

OTHER PUBLICATIONS

3GPP TS 36.321 V11.2.0, 3rd Generation Partnership Project; Technical Specification Group Radio Access Network; Evolved Universal Terrestrial Radio Access (E-UTRA); Medium Access Control (MAC) protocol specification (Release 1), Mar. 2013.

* cited by examiner

*Primary Examiner* — Diane Lo

(57) ABSTRACT

A method and apparatus for determining when to switch between buffer estimation states for a fixed frame rate services session at a terminal. In the event that the state is passive, a network node determines a first time between two received Radio Link Control Service Data Units (RLC SDU). If the first time is lower than a first time threshold, then the state is changed to proactive. When the state is proactive, the network node determines that two consecutive padding transport blocks have been received and further determines that a second time between two padding transport blocks is greater than a second time threshold. If so then the state is changed to passive.

26 Claims, 3 Drawing Sheets

METHOD AND APPARATUS IN A WIRELESS COMMUNICATION SYSTEM

This application is a 371 of International Application No. PCT/EP2013/071591, filed Oct. 16, 2013, the disclosure of which is fully incorporated herein by reference.

TECHNICAL FIELD

The present application relates to a method and apparatus in a wireless communication system, and in particular to a method of determining when to switch between buffer estimation states for reservation of buffer resources.

BACKGROUND

In Long Term Evolution (LTE) networks, packet scheduling is modeled in the Medium Access Control (MAC) layer and resides in the eNodeB (eNB). A scheduler assigns radio resources, also called Resource Blocks (B), for the downlink (termed assignments) as well as for the uplink (termed grants) using the Physical Downlink Control Channel (PDCCH). The radio uplink is the transmission path from a terminal, which may also be referred to as a User Equipment (UE), to a base station, or an eNodeB. A downlink is the transmission path from the eNodeB to the terminal.

For uplink scheduling, the eNodeB requires information about the current state of the buffers in the terminal and in particular how much data the terminal has in its priority queues. This information is sent from the terminal to the eNodeB either as a 1-bit Scheduling Request (SR) or by a Buffer Status Report (BSR). The SRs are transmitted on a control channel such as e.g. Physical Uplink Control Channel (PUCCH) or Radio Access Channel (RACH) while the BSRs are transmitted on the data channel such as e.g. Physical Uplink Shared Channel (PUSCH), mostly together with user data.

Precise and up-to-date scheduling information allows more accurate scheduling decisions, and can help to optimize the use and management of radio resources and to improve network capacity. However, the accuracy of the information provided by the terminal is limited by the granularity of the buffer status reports, by the frequency of the SR and buffer status report transmissions and by the delay between the reception of the SR or buffer status report and the scheduling decision. For delay-sensitive services with periodical packet arrival, such as Voice over Internet Protocol (VoIP), the likelihood that the buffer status information is outdated when it is used is high. It is likely that additional data has arrived since the buffer status report was transmitted. It is also likely that the buffer will be emptied frequently and therefore the only available information will be a one bit SR.

With incorrect uplink information, the scheduler will provide either a too large grant, which results in the terminal transmitting padding (essentially dummy data packets) and may reduce system capacity, or a too small grant, which may lead to Radio Link Control (RLC) segmentation and increase transmission delay.

Uplink buffer status reports are needed in order for the base station to know the amount of data waiting for transmission in the terminal. In E-UTRAN, uplink buffer status reports refer to the data that is buffered for a Logical Channel Group (LCG) in the terminal. Four LCGs and two formats are used for reporting in uplink: A short BSR format contains the buffer size of one LCG and a long BSR format contains the buffer sizes of all four LCGs. Uplink BSRs are transmitted using MAC signalling.

According to the previously known solution in LTE, a framework for buffer status reporting is specified. Buffer status reporting is used by the terminal to report to the eNodeB the amount of data stored in its buffers for transmission. The eNodeB uses these reports to allocate resources to the terminal, and to prioritize resource allocation between different terminals. The terminal triggers a regular BSR and SR when uplink data becomes available for transmission.

In the event that the terminal has data for more than one logical channel, the BSR can only contain information about one logical channel. A truncated format is available as padding Buffer Status Report. Another type of BSR Report, the Periodic BSR, provides a timer-based trigger per terminal to handle reporting for continuous flows.

Note that several logical channels can be mapped to a LCG so it is not possible to determine the buffer status for one logical channel from a BSR unless the logical channel is the only logical channel in the LCG. An SR only indicates that the terminal requires resources for a transmission.

The packet sizes used by VoIP depend on several factors, such as Robust Header Compression (used to reduce the packet size for VoIP), the IP version (IPv4 and IPv6 have different packet sizes) and the VoIP codec used (which may provide high quality voice with a large packet size, or lower quality voice with a smaller packet size).

Scheduling of VoIP services in uplink may be made more efficient by estimating the buffer size. A VoIP connection is either proactive (speech frames are being transmitted) or passive (no speech frames are being transmitted, there is silence and Silence Indicator (SID) frames are transmitted.). When transmission of speech frames stops, the algorithm moves from proactive to passive; when transmission of speech frames starts, the algorithm moves from passive to proactive.

One technique to determine when to move between states is based on the size of received data packets, on the assumption that SID frames are smaller than frames that contain voice data. This is described in WO2010090565A1. Another technique is based on analysis of the time between arrival of data packets. This is described in WO2012175113A1.

A problem with some of the known methods is that segmentation occurs when the terminal has insufficient power to transmit a complete data unit to the eNodeB with sufficient probability for successful detection. The data unit is segmented into two or more segments and the segments are transmitted in separate transmissions. Since the latency of the transmission is one of the most important factors for the quality of a VoIP connection, the eNodeB will attempt to transmit the segments within a short time. During this time it is not possible to keep track of the amount of data in the terminal buffer by only using the received BSR because the buffer size as reported in the BSR is quantized, and the BSR will often reach the eNodeB after the scheduling of the final segments of the data unit. The eNodeB is unable to sum the total amount of data received from the segments in time.

FIG. 1 shows a simplified picture of an uplink protocol stack with examples of some vital functions for VoIP in each layer. A terminal 1 communicates with an eNodeB via a physical layer 2. The MAC layer 3 is responsible for functions such as like SR where a terminal 1 that does not have a grant can send a signal to the eNodeB indicating the need to get scheduled. The MAC layer 3 in the eNodeB is also responsible for receiving BSRs and forward them to the scheduler. BSRs can only be transmitted when the terminal 1 has a grant and is triggered periodically (with a periodicity of for example 10 ms). Also, when a BSR is reported, logical channels are grouped into LCGs, where the logical channels within a group are supposed to have similar requirements.

For VoIP services, an RLC layer 4 provides multiplexing/de-multiplexing of logical channels. For a terminal using a VoIP service, the VoIP traffic is typically assigned its own logical channel. For example, when the same terminal needs to send measurement reports, this is done using another logical channel. A PDCP layer 5 is also provided. The above layers are all eNodeB functionality. A VoIP client layer 6 is also provided for decoding speech.

The known techniques for switching between the passive and proactive states when estimating buffer size have several problems. For example, using the size of SID and TALK packets to determine when to switch states is problematic because the size of those packets, as described above, depends on network configuration. It is therefore difficult to set reliable thresholds to determine when to switch between states. The size threshold may be between the size of a SID frame and the size of a talk frame.

Furthermore, the passive state may be entered if two or more consecutive TBs containing only padding are received. WO2012175113A1 refers to using the time between receiving SRs to determine when to switch states. However, an SR does not distinguish between logical channels. It only indicates that the terminal has new data in one of its logical channels, and so is not suitable for estimating the time of arrival of VoIP data packets.

A further problem occurs with segmentation of packets. When a BSR is triggered by the terminal, the number of bits that are currently available in the RLC buffer for each logical channel group are determined. This number is quantized to a 6 bit value (0 . . . 63) according to a table specified in 3GPP TS 36.321. This means that when the eNodeB receives a BSR it contains an overestimation of the buffer size, as the terminal needs to secure resources that are sufficient to completely empty its buffer. This over-estimation is normally not a big problem, but can become a problem when the state switching algorithm uses padding as a trigger for switching from the proactive to the passive state. Consider the case where the terminal is in TALK state and the channel quality is poor. In this case VoIP packets will be segmented, often into small transport blocks (less than 100 bits). The scheduler will schedule the segments as often as possible, but this scheduling is based on a BSR that over-estimates the amount of data in the buffer. When the buffer is empty in the terminal, a padding BSR is triggered indicating that there is no more data to be scheduled, but there can be several grants out-standing grants. These out-standing grants will cause padding transmission by the terminal, and these transmissions can cause an erroneous switching from proactive to passive state.

Finally, traffic on other logical channels can lead to incorrect switching between states. Using BSRs for state estimation can cause confusion when data arrives in the same LCG but for another logical channel than the VoIP data. For SRs, this problem is even more severe, since for these there is no indication of logical channel or logical channel group at all. 3GPP only provides 4 LCGs. It is not always possible to reserve an LCG for the VoIP bearer. In many cases the VoIP bearer will not be the only bearer in the LCG. In case a video bearer or a bearer for VoIP control signaling is mapped to the same LCG as the VoIP bearer, it will be impossible to determine from a BSR if a terminal has VoIP data in its buffer or other data. For example, when the terminal needs to transmit a measurement report, this is done using the Radio Resource Control (RRC) protocol, and an RRC message will be added to the terminal RLC buffer. The terminal may trigger an SR due to this, and this SR may incorrectly trigger a switch from passive to proactive state when received by the eNodeB.

SUMMARY

It is an object to obviate at least some of the disadvantages described above and provide an improved performance within a communication system.

According to a first aspect, the object is achieved by a method in a network node. The method provides a way to determine when to switch between buffer estimation states for a fixed frame rate services session at a terminal. In the event that the state is passive, the network node determines a first time between two received Radio Link Control Service Data Units (RLC SDU). If the first time is lower than a first time threshold, then the state is changed to proactive. When the state is proactive, the network node determines that two consecutive padding transport blocks (TBs) have been received and further determines that a second time between two padding transport blocks is greater than a second time threshold. If so then the state is changed to passive.

As an option, the first time threshold is predetermined. This is optionally fixed, or dynamically predetermined based on any of network conditions and a codec used for the fixed frame rate services session, The first time is optionally determined between two consecutively received RLC SDUs.

As an option, the second time threshold is predetermined. This is optionally fixed or dynamically determined based on any of network conditions and a known degree of RLC segmentation.

The second time is optionally determined between any of two consecutively received padding TBs and a time between first and last received padding TBs.

The state is optionally changed from proactive to passive on the basis on a number of padding transport blocks received.

An optional example of a network node implementing the method is a base station.

As a further option, the method includes buffer estimation for the terminal based on the buffer estimation state.

The fixed frame rate services session is typically a Voice over IP (VoIP) session, but may be any other type of fixed frames rates services session such as a video session.

According to a second aspect, there is provided a network node for use in a wireless communication system. The network node is provided with a processor for determining when to switch between buffer estimation states for a fixed frame rates service session at a terminal. A receiver is provided for receiving RLC SDUs, the processor being arranged to, in the event that the state is passive, determine a first time between two received RLC SDUs and in the event that the first time is lower than a first time threshold, change the state to proactive. The processor is further arranged to, in the event that the state is proactive, determine that two consecutive padding transport blocks have been received and further determine a second time between two received RLC SDUs and in the event that the second time is higher than a second time threshold, change the state to passive.

As an option, the processor is arranged to use any of a predetermined first time threshold and a predetermined second time threshold.

The processor is optionally further arranged to change the state from the proactive state to the passive state based on a size of a received RLC SDU being smaller than a size threshold.

The network node is optionally provided with a buffer, in which case the processor is arranged to estimate a buffer for the terminal based on the buffer estimation state.

An optional example of the network node is a base station.

As an option, the fixed frames rates services session comprises any of a Voice over IP, VoIP, session and a video session.

According to a third aspect, there is provided a computer program, comprising computer readable code which, when run on a network node causes the network node to perform the method as described above in the first aspect.

According to a fourth aspect, there is provided a computer program product comprising a non-transitory computer readable medium and a computer program as described above in the third aspect, wherein the computer program is stored on the non-transitory computer readable medium.

DETAILED DESCRIPTION

Figure 1:
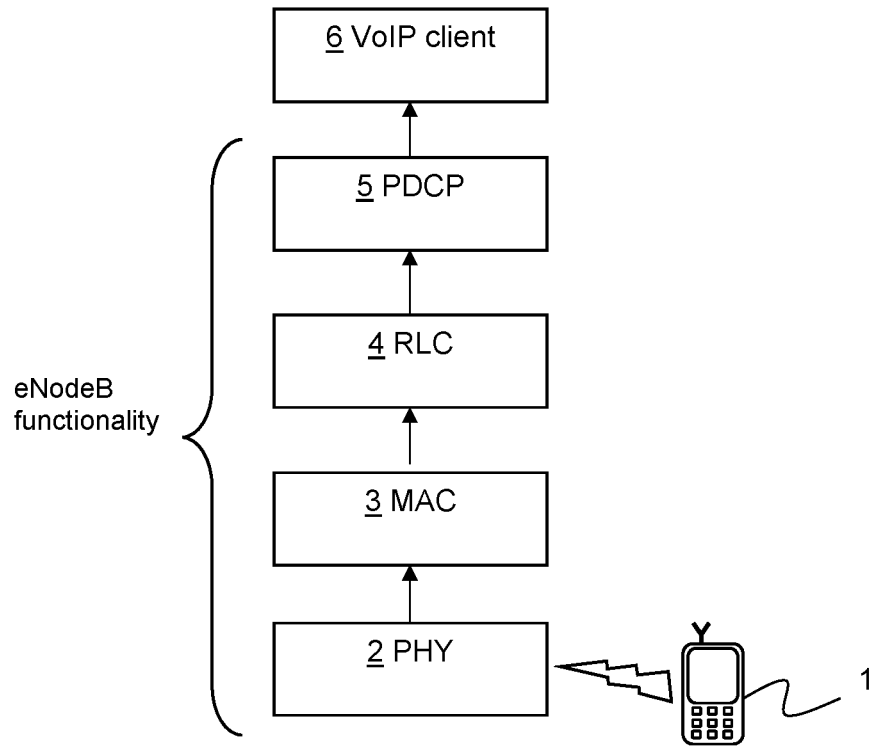
FIG. 1 illustrates schematically in a block diagram a simplified uplink protocol stack in LTE.

There is described herein a method and network node, which may be put into practice in the embodiments described below. It will be appreciated that the network node may be embodied in many different forms and the following description should not be constructed as limited to the embodiments set forth herein. These embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

The present embodiments are to be considered in all respects as illustrative and not restrictive, and all changes coming within the meaning and equivalency range of the appended claims are intended to be embraced therein.

In an embodiment, the network node described herein is a base station. It is to be understood that another configuration of base station transceivers may be connected through, for example, a mobile switching centre and other network nodes, to define a wireless communication network. The base station may be referred to as, for example, a Remote Radio Unit, an access point, a Node B, an evolved Node B (eNodeB) and/or a base transceiver station, a Radio Base Station (RBS), an Access Point Base Station, base station router, etc. depending on the radio access technology and terminology used.

In some embodiments, the terminal may be represented by a wireless communication device, a wireless communication terminal, a mobile cellular telephone, a Personal Communications Systems terminal, a Personal Digital Assistant (PDA), a laptop, a User Equipment (UE), a computer or any other kind of device capable of managing radio resources.

The wireless communication network may be based on technologies such as e.g. Long Time Evolution (LTE), Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc.

Further, as used herein, the wireless communication network may further, according to some embodiments, refer to Wireless Local Area Networks (WLAN), such as Wireless Fidelity (Wi-Fi) and Worldwide Interoperability for Microwave Access (WiMAX), Bluetooth or according to any other wireless communication technology.

The base station is adapted to schedule uplink transmissions from the terminal to the base station. In order to grant a particular terminal access to a particular uplink resource, a grant is sent from the base station to the terminal, based on the estimated buffer status at the terminal. The expression "downlink" is here used to specify the transmission from the base station to the terminal, while the expression "uplink" is used to denote the transmission from the terminal to the base station.

The following description uses an exemplary VoIP session to illustrate the principles of estimating buffer size. This is by way of example only. It will be appreciated that the same techniques may be used for any type of fixed frame rate services session including, but not limited to, VoIP sessions and video sessions.

Figure 2:
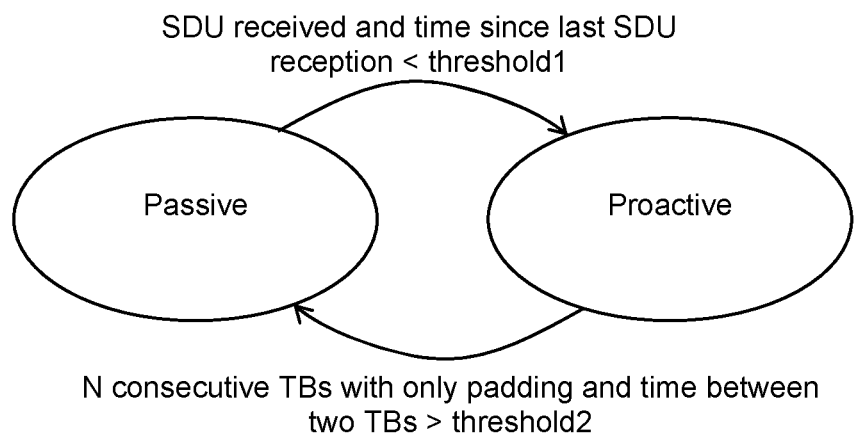
FIG. 2 illustrates schematically switching between passive and proactive states.

FIG. 2 illustrates the buffer estimation state, and the conditions under which a switch between the passive and the proactive state is made.

Incorrect estimation of the buffer state can lead to an inaccurate reservation of buffer resources at the base station for a VoIP session at the terminal. A Service Data Unit (SDU) is any kind of RLC SDU, and is transmitted on a VoIP logical channel. An SDU is therefore specific to a logical channel and can be positively associated with a VoIP session. Basing switching on SDU reception can therefore remove the problem of switching cause by packets sent on other, non-VoIP logical channels. It is proposed to switch the buffer estimation state from the passive to the proactive state if a first time between reception of SDUs (which may be consecutive SDUs) is lower than a first time threshold. This is because TALK frames are typically sent more frequently than SID frames. For example, a TALK SDU may be sent every 20 ms during the proactive state, whereas a SID SDU may be sent ever 160 ms. By setting the first time threshold between those values, the buffer estimation state can be accurately switched from the passive to the active state.

As discussed above, the problem of segmenting of VoIP packets can lead to incorrectly switching from the proactive to the passive state. This can lead to an inaccurate estimation of the state of the terminal session, and cause incorrect reservation of buffer resources at the base station. It has been realised that changing the switching from the proactive to the passive state based on the time between reception of consecutive padding transport blocks (TBs) addresses this. The switch from the proactive state to the passive state is therefore only made if the arrival time between the TBs containing no payload data (indicating padding) is larger than a second time threshold. A padding TB is considered to be a TB that contains only padding instead of payload.

Figure 3:
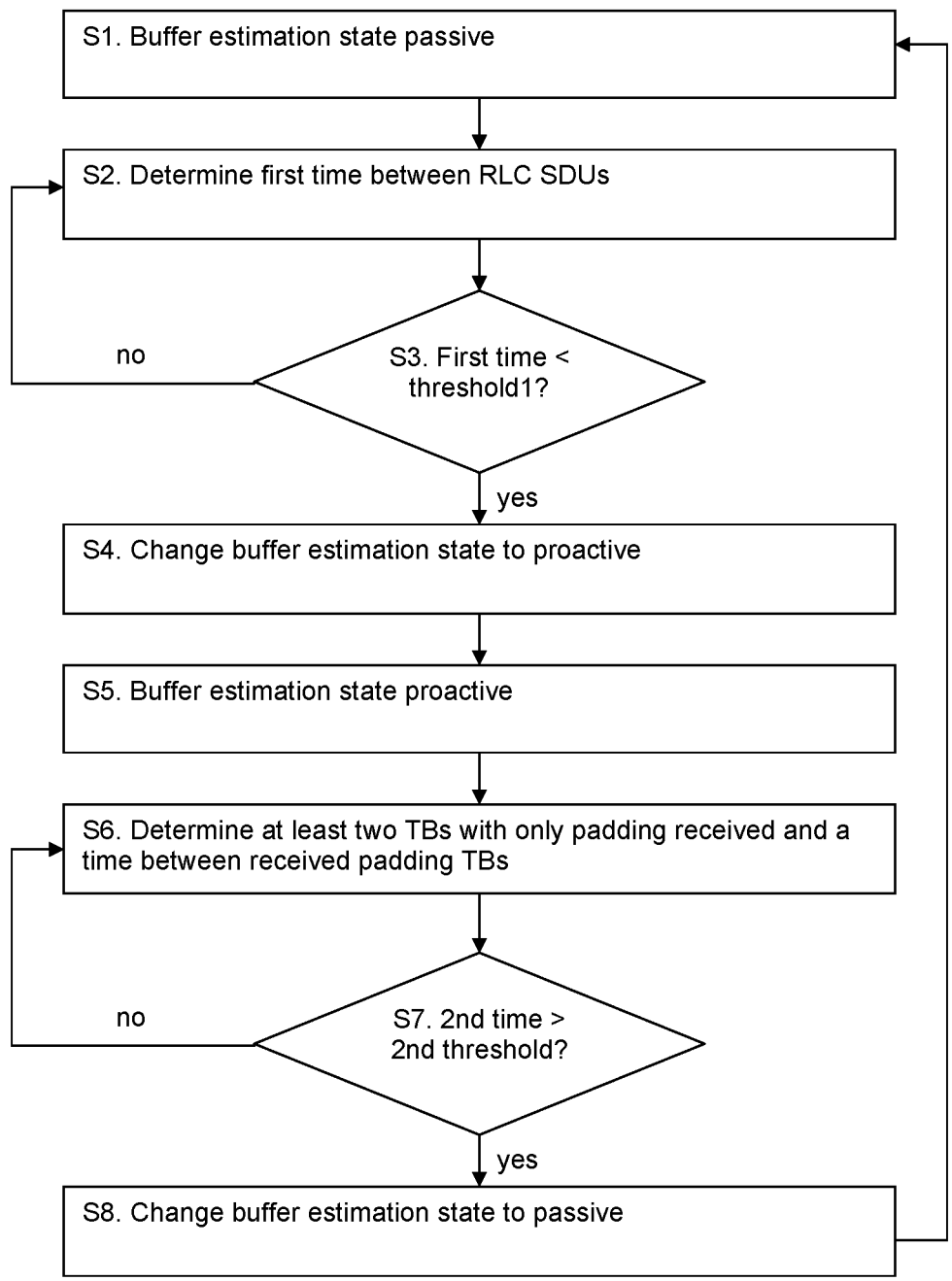
FIG. 3 is a flow diagram showing exemplary steps of a method in a base station.

Turning to FIG. 3, the steps of an exemplary embodiment in which the buffer estimation state is initially passive (SID frames are being sent) are shown. The following numbering corresponds to that of FIG. 3:

S1. The buffer estimation state is passive, as SID frames are being sent from the terminal to the base station.

S2. A determination is made of a first time between reception of RLC SDUs. These may be consecutively received SDUs.

S3. A determination is made to ascertain whether the time between receiving RLC SDUs is below a first threshold. This threshold may be predetermined and may be dynamically determined based on factors such as network conditions or the codec used for the session. For example, for a codec with a TALK frame interval of 20 ms and a SID frame interval of 160 ms, the threshold may be set at around 40-50 ms. A different codec may use different intervals, in which case the threshold would be different. If the time between receiving RLC SDUs is not below the first threshold, then the procedure reverts to step S2.

S4. As the first time is below the first threshold, the buffer estimation state is changed to proactive, and buffer resources may be reallocated to the terminal accordingly.

S5. The buffer estimation state is proactive, as TALK frames are being sent from the terminal to the base station.

S6. A determination is made of a second time between reception of padding TBs. These may be consecutively received padding TBs. Where more than two padding TBs are received, the second time may be the time between consecutive padding TBs or the time between the first and last received padding TBs.

S7. A determination is made to ascertain whether the second time between receiving padding TBs is above a second threshold. This threshold may be predetermined and may be dynamically determined based on network conditions. If the second time is below the second threshold, then the procedure reverts to step S6.

S8. As the second time is above the second threshold, the buffer estimation state is changed to passive, and the procedure reverts to step S1.

Figure 4:
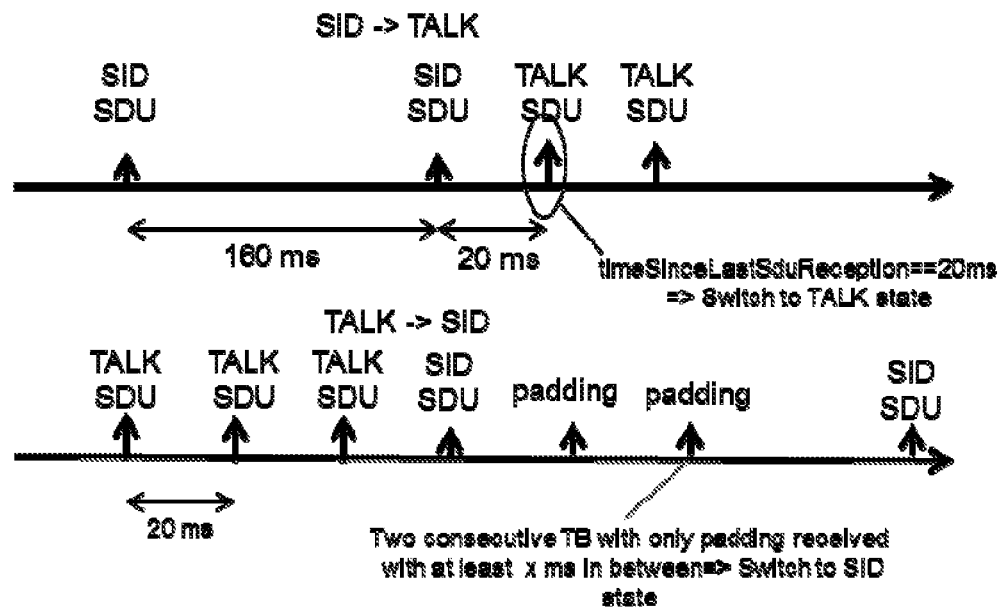
FIG. 4 illustrates schematically exemplary switching between passive and proactive buffer estimation states.

FIG. 4 shows an exemplary switch from passive (SID frames being sent) to proactive (TALK frames being sent). There is a 160 ms time gap between the first two received RLC SDUs, and only a 20 ms time gap between the second and third SDU. As this time gap falls below a predetermined threshold, then the buffer estimation state is switched to proactive. In the example of the switch from proactive (TALK frames being sent) to passive (SID frames being sent), when it is determined that a time between padding TBs exceeds the second threshold, a switch from proactive to passive is made.

Figure 5:
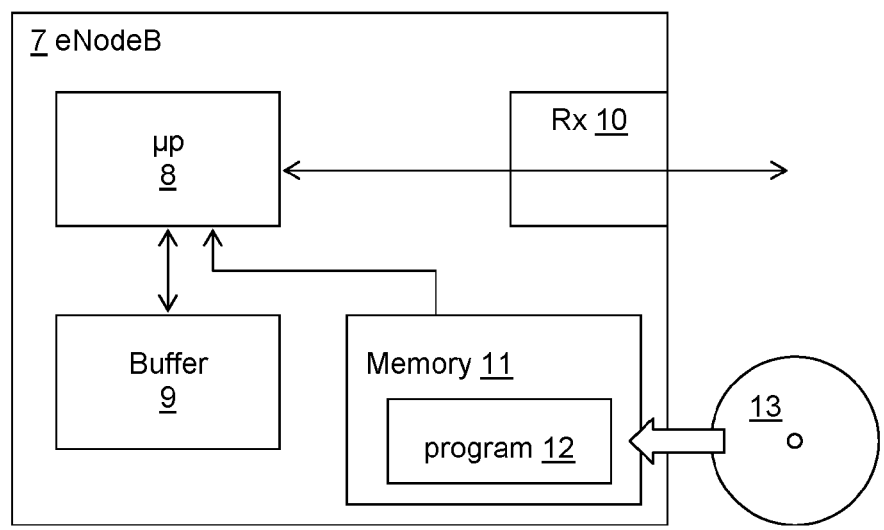
FIG. 5 illustrates schematically in a block diagram an exemplary network node.

FIG. 5 illustrates schematically in a block diagram an exemplary network node such as a base station. In this example, the base station is an eNodeB 7. The eNodeB 7 is provided with a processor 8 for determining when to switch between buffer estimation states. A buffer 9 is provided that can have resources allocated to the terminal. A receiver 10 is provided that receives RLC SDUs. As described above, the processor 8 determines on the basis of a time between the RLC SDUs and a predetermined threshold whether to switch from the passive to the proactive state. The processor 8 is also arranged to, in the event that the state is proactive, determine the second time between two received padding TBs and in the event that the second time is higher than the second time threshold, change the state to passive. The processor 8 is further arranged to allocate buffer resources to the terminal on the basis of the buffer estimation state.

A non-transitory computer readable medium in the form of a memory 11 is provided which may be used to store data such as predetermined time thresholds. It may also be used to store a computer program 12 which, when executed by the processor 8, causes the processor to implement the techniques described above. Note that the computer program 12 may be stored on an external non-transitory computer readable medium in the form of a second memory, examples of which include compact disks and flash drives. The computer program may be transferred from the second memory 13 to the memory 11, or directly to the processor 8 for execution.

The techniques described above address the problem of switching between the passive and proactive buffer estimation states when the respective packet sizes are unknown. There are no conditions required that include the size of received packets or the buffer size in the terminal. Instead the switching is done based on the time between received packets as well as an indication that no payload data was received in a transport block (i.e. a padding packet has been received).

The techniques described above also address the issue of incorrect switching from the proactive to the passive buffer estimation states when VoIP packets require extensive segmentation, for example because of deteriorating network conditions or reduced terminal power. As described above, segmentation together with an over-estimation of the terminal buffer status may lead to reception of a number of padding TBs while still in proactive state which, using prior art algorithms based on a number of padding TBs received, can lead to incorrect switching to the passive state. The techniques described above address this by additionally considering the time between reception of padding transport blocks has been received. This is sufficiently sensitive to determine when padding transport blocks are received as a result of segmentation. The second threshold can be set high enough to prevent switching when a number of padding transport blocks are received within the time it takes for a new buffer status report to take effect in the scheduler (typically 4-6 ms).

The techniques described above address the issue of incorrectly switching from the passive to the proactive buffer estimation state in the event that there is non-VoIP traffic on other logical channels. Switching from the passive to the proactive buffer estimation state is only based on reception of RLC SDUs, which are associated with the logical channel such as that used for VoIP. The technique may easily be extended to filter out RLC SDUs that belong to other logical channels than the logical channel that is configured for e.g. VoIP.

It will be appreciated by the person of skill in the art that various modifications may be made to the above described embodiments without departing from the scope of the present invention as defined in the appended claims.

The following abbreviations have been used in this description:
3rd Generation Partnership Project (3GPP)
BSR Buffer Status Report
CDMA Code Division Multiple Access
EDGE Enhanced Data rates for GSM Evolution
GPRS General Packet Radio Service
GSM Global System for Mobile Telecommunications
HDR High Data Rate
HSDPA High Speed Downlink Packet Data Access HSPA High Speed Packet Data Access
HSUPA High Speed Uplink Packet Data Access
LCG Logical Channel Group
LTE Long Term Evolution
MAC Medium Access Control
PDA Personal Digital Assistant
PDCCH Physical Downlink Control Channel
PDCP Packet Data Convergence Protocol
PDU Protocol Data Unit
PHY Physical layer
PUCCH Physical Uplink Control Channel
PUSCH Physical Uplink Shared Channel
RACH Radio Access Channel
RB Resource Block
RLC Radio Link Control
RoHC Robust Header Compression
RRC Radio Resource Control
SABE Service Aware Buffer Estimation
SDU Service Data Unit
SID Silence Insertion Descriptor
SR Scheduling Request
TB Transport Block
UE User Equipment
UMTS Universal Mobile Telecommunications System
VoIP Voice over IP
WCDMA Wideband Code Division Multiple Access
WiFi Wireless Fidelity
WiMAX Worldwide Interoperability for Microwave Access
WLAN Wireless Local Area Network

The invention claimed is:

1. A method in a network node of a wireless communication system for determining when to switch between buffer estimation states for a fixed frame rate services session at a terminal, the method comprising, at the network node:
   in the event that the state is passive, determining a first time between two received Radio Link Control Service Data Units (RLC SDUs) and in the event that the first time is lower than a first time threshold, changing the state to proactive; and
   in the event that the state is proactive, determining that two consecutive padding transport blocks have been received, further determining whether a second time between two padding transport blocks is greater than a second time threshold, and in the event the second time is greater than the second time threshold, changing the state to passive.

2. The method according claim 1, wherein the first time threshold is predetermined.

3. The method according to claim 2, wherein the first time threshold is based on any of network conditions and a codec used for the fixed frame rate services session.

4. The method according to claim 1, wherein the first time is determined between two consecutively received RLC SDUs.

5. The method according to claim 1, wherein the second time threshold is predetermined.

6. The method according to claim 5, wherein the second time threshold is based on any of network conditions and a known degree of RLC segmentation.

7. The method according to claim 1, wherein the second time is determined between any of two consecutively received padding transport blocks and a time between first and last received padding transport blocks.

8. The method according to claim 1, further comprising changing the state from proactive to passive on the basis on a number of padding transport blocks received.

9. The method according to claim 1, wherein the network node is a base station.

10. The method according to claim 1, further comprising buffer estimation for the terminal based on the buffer estimation state.

11. The method according to claim 1, wherein the fixed frames rates services session comprises any of a Voice over IP (VOIP) session and a video session.

12. A network node for use in a wireless communication system, the network node comprising:
   a processor arranged for determining when to switch between buffer estimation states for a fixed frame rates service session at a terminal;
   a receiver configured to receive Radio Link Control Service Data Units (RLC SDUs);
   the processor being arranged to, in the event that the state is passive, determine a first time between two received RLC SDUs and in the event that the first time is lower than a first time threshold, change the state to proactive; and
   the processor being further arranged to, in the event that the state is proactive, determine that two consecutive padding transport blocks have been received and further determine whether a second time between two padding transport blocks is greater than a second time threshold, and in the event the second time is greater than the second time threshold, change the state to passive.

13. The network node according to claim 12, wherein the processor is arranged to use any of a predetermined first time threshold and a predetermined second time threshold.

14. The network node according to claim 12, wherein the processor is further arranged to change the state from the proactive state to the passive state based on a size of a received RLC SDU being smaller than a size threshold.

15. The network node according to claim 12, further comprising a buffer, the processor arranged to estimate a buffer for the terminal based on the buffer estimation state.

16. The network node according to claim 12, wherein the network node is a base station.

17. The network node according to claim 12, wherein the fixed frames rates services session comprises any of a Voice over IP (VOIP) session and a video session.

18. The network node according to claim 12, wherein the first time is determined between two consecutively received RLC SDUs.

19. The network node according to claim 12, wherein the second time threshold is predetermined.

20. The network node according to claim 19, wherein the second time threshold is based on any of network conditions and a known degree of RLC segmentation.

21. The network node according to claim 12, wherein the second time is determined between any of two consecutively received padding transport blocks and a time between first and last received padding transport blocks.

22. A non-transitory computer readable medium comprising computer program instructions which when executed by a processor, cause a network node to perform as follows:
   in the event that the state is passive, determining a first time between two received Radio Link Control Service Data Units (RLC SDUs) and in the event that the first time is lower than a first time threshold, changing the state to proactive; and,
   in the event that the state is proactive, determining that two consecutive padding transport blocks have been received, further determining whether a second time between two padding transport blocks is greater than a second time threshold, and in the event the second time is greater than the second time threshold, changing the state to passive.

23. The non-transitory computer readable medium according to claim 22, wherein the first time is determined between two consecutively received RLC SDUs.

24. The non-transitory computer readable medium according to claim 22, wherein the second time threshold is predetermined.

25. The non-transitory computer readable medium according to claim 24, wherein the second time threshold is based on any of network conditions and a known degree of RLC segmentation.

26. The non-transitory computer readable medium according to claim 22, wherein the second time is determined between any of two consecutively received padding transport blocks and a time between first and last received padding transport blocks.

\* \* \* \* \*